United States Patent [19]
Hirst

[11] Patent Number: 6,127,816
[45] Date of Patent: Oct. 3, 2000

[54] MULTIPLE FREQUENCY SWITCHING POWER SUPPLY AND METHODS TO OPERATE A SWITCHING POWER SUPPLY

[75] Inventor: B. Mark Hirst, Boise, Id.

[73] Assignee: Hewlett-Packard Company, Palo Alto, Calif.

[21] Appl. No.: 09/368,401

[22] Filed: Aug. 4, 1999

[51] Int. Cl.[7] .................................................. G05F 1/44
[52] U.S. Cl. .......................................... 323/283; 323/284
[58] Field of Search .................................. 323/283, 285, 323/284, 282

[56] References Cited

U.S. PATENT DOCUMENTS

| | | | |
|---|---|---|---|
| Re. 36,098 | 2/1999 | Vinciarelli | 363/20 |
| 4,030,015 | 6/1977 | Herko et al. | 323/266 |
| 4,669,038 | 5/1987 | Whitford | 363/25 |
| 4,683,415 | 7/1987 | Zimmerman | 323/282 |
| 4,683,529 | 7/1987 | Bucher, II | 363/44 |
| 4,760,324 | 7/1988 | Underhill | 323/282 |
| 5,018,805 | 5/1991 | Kessler | 350/6.5 |
| 5,079,569 | 1/1992 | Bunch, Jr. | 346/136 |
| 5,195,176 | 3/1993 | Lung | 395/115 |
| 5,245,442 | 9/1993 | Yang | 358/300 |
| 5,390,101 | 2/1995 | Brown | 363/20 |
| 5,481,178 | 1/1996 | Wilcox et al. | 323/287 |
| 5,675,479 | 10/1997 | Tani et al. | 363/19 |
| 5,691,632 | 11/1997 | Otake | 323/282 |
| 5,907,482 | 5/1999 | Otake | 363/41 |
| 5,969,515 | 10/1999 | Oglesbee | 323/283 |

*Primary Examiner*—Shawn Riley

[57] ABSTRACT

A multiple frequency switching power supply including a pulse width modulation circuit having an output, having an input and having a clock signal input. The power supply also includes a switching transistor having first and second current-carrying electrodes and a control electrode. The first current-carrying electrode is coupled to a voltage source, the control electrode is coupled to the output of the pulse width modulation circuit and the second current-carrying electrode is coupled to a power supply output configured to provide a regulated output voltage. The power supply additionally includes a voltage sensing circuit coupled to the power supply output and having an output coupled to the pulse width modulation circuit input and a switch coupled to the clock input of the pulse width modulation circuit. The switch supplies a first clock signal having a first frequency when the power supply is in a normal mode of operation and supplies a second clock signal having a second frequency more than an order of magnitude lower than the first frequency when the power supply is in a standby mode of operation.

20 Claims, 3 Drawing Sheets

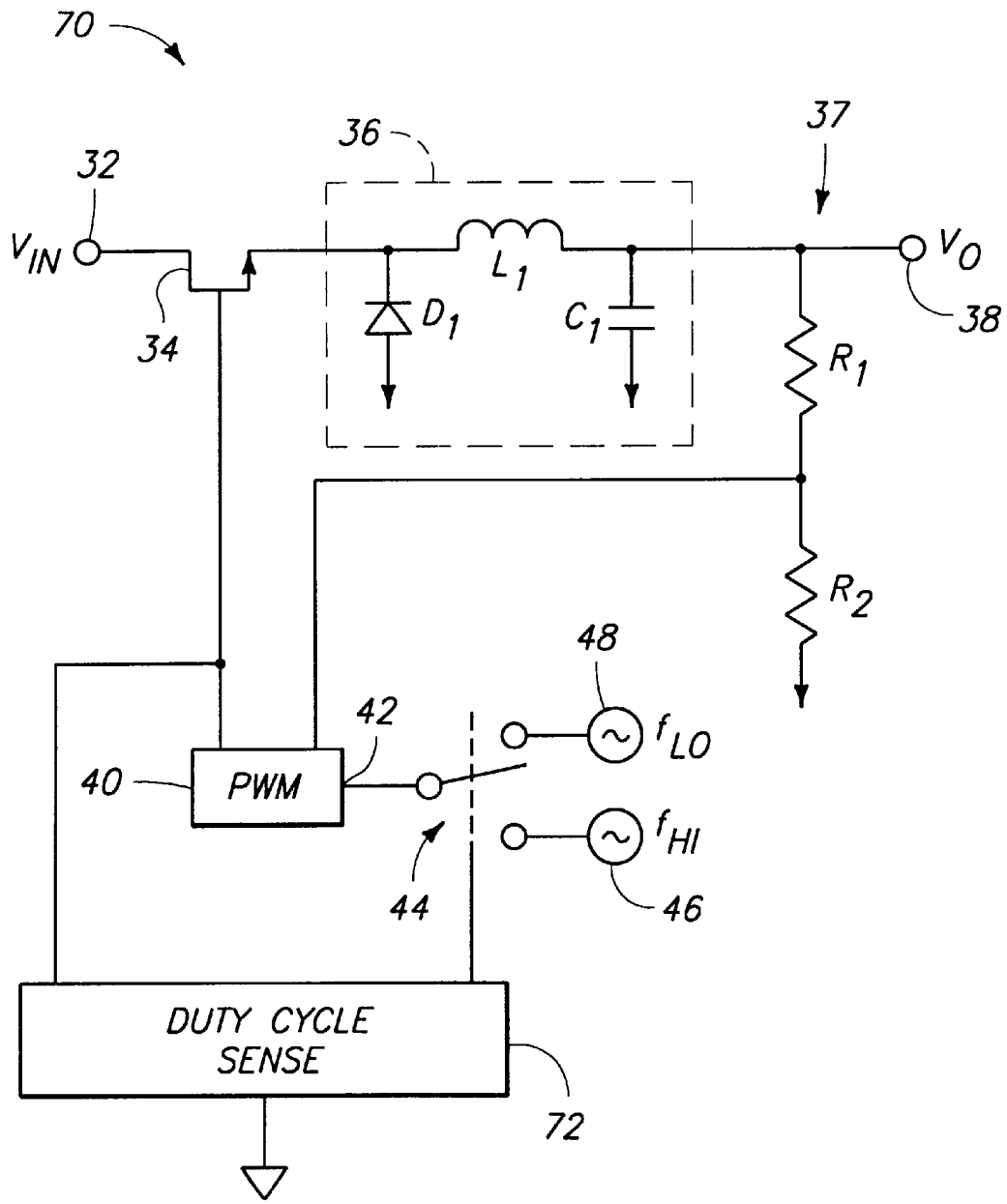

MULTIPLE FREQUENCY SWITCHING POWER SUPPLY AND METHODS TO OPERATE A SWITCHING POWER SUPPLY

FIELD OF THE INVENTION

The invention relates to multiple frequency switching power supplies and methods to operate a switching power supply.

BACKGROUND OF THE INVENTION

Switching power supplies are used in applications where power supply efficiency is a concern. Several different types of switching power supplies are known and commonly used. A first type is known as a "bucking" power supply. Bucking supplies are DC-to-DC converters providing a stable output voltage from an input voltage that is larger than the output voltage. In other words, by bucking a portion of the electromotive force of the input voltage, the bucking supply is able to provide a regulated, reduced output voltage. Ideally, the bucking supply is able to perform voltage step-down and regulation functions with very little power loss.

A second type of switching power supply is known as a "boosting" power supply. Boosting power supplies incorporate a transformer or coil and one or more switches coupled in series with a primary winding of the transformer or in series with the coil. Boosting power supplies are able to supply a DC output voltage from a DC input voltage that is lower than the output voltage. Examples of switching power supplies using both principles of operation are described in U.S. Pat. No. 5,691,632, entitled "Switching Power Supply," issued to Otake and hereby incorporated herein by reference. These examples use a switching transistor as a synchronous rectifier. Efficiency of switching transistor operation is improved by reducing charge storage effects.

Other examples of switching power supplies are known. For example, U.S. Pat. No. 5,675,479, issued to Tani et al. and hereby incorporated herein by reference, discloses a switching power supply where efficiency is improved under light loading by lowering the switching speed of a switching element. Under heavy load, output ripple is reduced by increasing switching speed.

U.S. Pat. No. 5,390,101, issued to Brown and hereby incorporated herein by reference, discloses a switching power supply having a voltage controlled oscillator (VCO) to provide high efficiency operation throughout a wide range of input voltages and load conditions. VCO frequency is increased when output loading increases. U.S. Pat. No. 4,683,529, issued to Bucher II and hereby incorporated herein by reference, discloses a switching power supply that uses pulse-width modulation together with switching frequency modulation to maintain high efficiency.

All of these examples are concerned with maintaining efficiency over portions of a load curve where significant amounts of power are being drawn from the switching power supply. As a result, the range of frequencies over which they operate is relatively narrow. Additionally, power dissipation in switching power supplies (i.e., inefficiency) is composed of two principal components: (i) conduction losses, caused by parasitic resistance in power supply components and (ii) switching losses, caused by charge storage and other effects in the switching elements. Switching losses are proportional to switching speed.

When the amount of electrical power being drawn from the switching power supply is reduced to very low levels, the conduction losses become very small and the switching losses are the dominant source of switching power supply inefficiency. For example, switching power supplies that have efficiencies on the order of 95% under normal loading may have efficiencies of about 50% under standby conditions, due primarily to switching losses.

Moreover, increased concern over pollution caused by power generation and increasingly larger numbers of electrically-powered devices used in homes and industry combine to create new standards and guidelines for power consumption budgets for electrical appliances. Also, increasing numbers of electrical appliances are maintained in a "ready-to-operate" state twenty-four hours a day.

Further, the EPA has developed new guidelines for compliance with Energy Star power consumption limit guidelines for power budgets for such appliances. As a result, these appliances are being designed to incorporate power-saving "standby" modes whereby the appliance is both ready to be operated and is consuming as little electricity as possible whilst in the standby mode.

Additionally, as the number and the diversity of electrically-powered appliances has increased, especially data communications, data storage and data manipulation appliances, demand has grown for battery-powered electrical appliances. Consumer trends for such appliances place heavy emphasis on size and weight for the appliances. A particular emphasis on increased battery life, and hence on reduced consumption of electrical power, places a substantial premium on reduction of power consumption in such appliances.

What is needed is a new type of switching power supply capable of extremely low power consumption in a standby mode while still being capable of supporting all required functions in a host appliance and which is also capable of switching very rapidly to full power operation on demand.

SUMMARY OF THE INVENTION

In a first aspect, the invention provides a multiple frequency switching power supply. The power supply includes a pulse width modulation circuit having an output, having an input and having a clock signal input. The power supply also includes a switching transistor having first and second currentcarrying electrodes and having a control electrode. The first current-carrying electrode is coupled to a voltage source, the control electrode is coupled to the output of the pulse width modulation circuit and the second current-carrying electrode is coupled to a power supply output configured to provide a regulated output voltage. The power supply additionally includes a voltage sensing circuit coupled to the power supply output and having an output coupled to the pulse width modulation circuit input and also includes a switch coupled to the clock input of the pulse width modulation circuit. The switch supplies a first clock signal having a first frequency to the pulse width modulation circuit when the power supply is in a normal mode of operation and supplies a second clock signal having a second frequency more than order of magnitude lower than the first frequency to the pulse width modulation circuit when the power supply is in a standby mode of operation.

In another aspect, the invention provides a method to operate a switching power supply. The method includes determining when an output current from the power supply falls below a threshold and switching from one switching frequency to another, discrete switching frequency when the output current falls below the threshold.

In another aspect, the invention provides a method to operate a switching power supply. The method includes determining when an output current from the power supply is above a threshold and supplying a first switching signal having a first frequency to a switching transistor in the power supply when the output current is above the threshold. The method also includes determining when the output current from the power supply is below the threshold and supplying a second switching signal having a second frequency to the switching transistor in the power supply when the output current is below the threshold. The second frequency is less than one-one hundredth of the first frequency.

DESCRIPTION OF THE DRAWINGS

Preferred embodiments of the invention are described below with reference to the following accompanying drawings.

FIG. 4 is a simplified schematic diagram of a multiple frequency switching power supply, in accordance with an embodiment of the present invention.

DETAILED DESCRIPTION OF THE INVENTION

Figure 1:
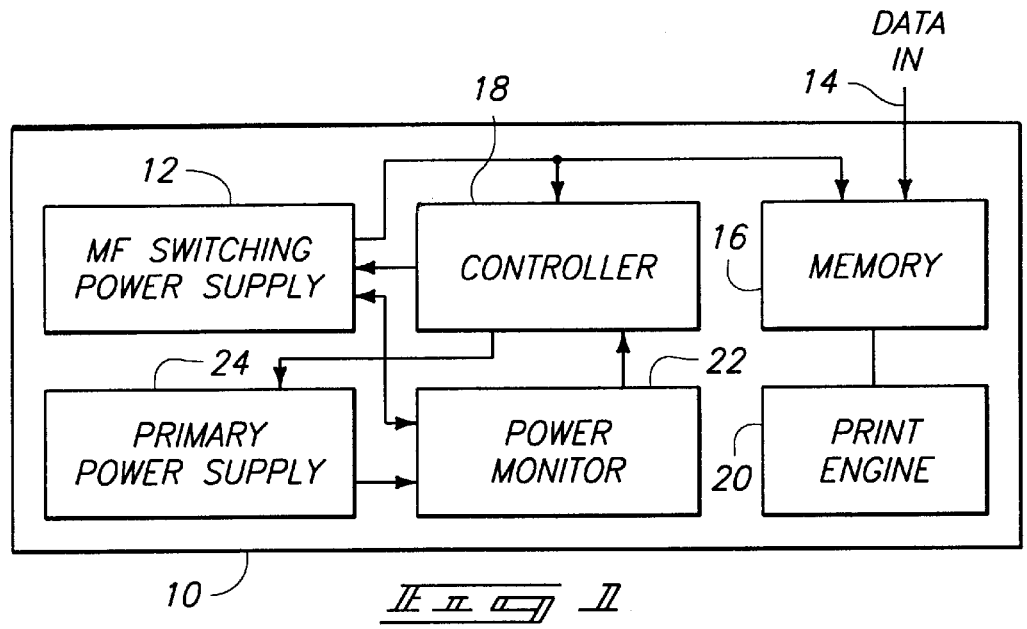
FIG. 1 is a simplified block diagram of a host appliance incorporating a multiple frequency switching power supply, in accordance with an embodiment of the present invention.

FIG. 1 is a simplified block diagram of a laser printer 10 incorporating a multiple frequency switching power supply 12, in accordance with an embodiment of the present invention. The laser printer 10 includes a data input port 14, a data memory 16, a controller 18 and a print engine 20. The laser printer 10 also includes a power consumption monitor 22, a primary AC-to-DC power supply 24 and one or more efficient DC-to-DC switching power supplies 12 coupled to the primary power supply 24.

Laser printers 10 may be formed to provide relatively high speed print capability, as described, for example, in U.S. Pat. No. 5,195,176, entitled "Method and Apparatus to Enhance Laser Printer Speed and Functionality," issued to Lung and hereby incorporated herein by reference. Color print capability is described in U.S. Pat. No. 5,018,805, entitled "Laser Printer," issued to Kessler and hereby incorporated herein by reference. Improvements in or affecting print engines in laser printers are described in U.S. Pat. No. 5,245,442, entitled "Multi-Functional Laser Printer," issued to Yang and U.S. Pat. No. 5,079,569, entitled "Laser Printer With Paper Positioning and Tensioning Features," issued to Bunch, Jr., which patents are hereby incorporated herein by reference.

In laser printers 10, the data input port 14 and the data memory 16 are typically digital circuits that operate together under the direction of the controller 18 to accept input data at a relatively high speed at the input port 14, store the input data in the data memory 16 and then process portions of the input data to provide printed output matter from the print engine 20.

In laser printers 10, output data, in the form of printed material, is output from the print engine 20 at a much lower rate than the data input rate. When the laser printer 10 has input data supplied to the data input port 14, the data memory 16 provides temporary storage of the input data until the input data can all be processed.

In order to reduce power consumption due to operation of the data input port 14, the data memory 16, the controller 18 and the print engine 20, these components have been designed to operate with progressively lower power supply voltages over the last several years. However, other kinds of functions, such as an electromechanical drive for feeding paper through the print engine 20, require higher voltages or currents in order to operate properly. As a result, the AC-to-DC power supply 24 is often used to provide a primary power supply, with one or more efficient DC-to-DC switching power supplies 12 to provide the data-handling circuits 14, 16 and 18 with electrical power.

In normal operation, the power consumption monitor 22 detects normal power consumption and provides control signals to maintain normal power supply functions. When, however, no input data are present at the data input port 14 and the print engine 20 is not active, power consumption decreases. When the power consumption monitor 22 detects reduced power consumption, signals from the power consumption monitor 22 place the multiple frequency switching power supply 12 in a standby mode.

In the standby mode, the multiple frequency switching power supply 12 switches from a first clock signal to a second clock signal having a lower frequency than the first clock signal to reduce switching speed and thus to reduce switching losses in the multiple frequency switching power supply 12. In one embodiment, the second clock signal has a frequency that is one-one hundredth to one-one thousandth of the frequency of the first clock signal.

There are significant advantages to discontinuously switching to a second clock signal having a frequency that is well outside of a range of frequencies for a first clock signal. A first advantage is that a sharply reduced clock signal frequency also provides a sharp increase in switching power supply efficiency because switching losses are dramatically reduced. A second advantage is that circuit complexity is reduced compared to what would be required for a single oscillator to be able to provide such diverse frequencies.

A third advantage is that the range of clock frequencies available through discontinuous switching of clock frequencies is increased. This arises because the small changes in loading that are used to provide incremental or continuous, rather than discontinuous, changes in clock signal frequency do not support such great modification of clock frequency from a VCO.

VCOs operate over a limited range of frequencies having an upper frequency bound that is, at most, two to three times as great as a lower frequency bound. In other words, a switching power supply that uses a VCO to vary switching frequency within a range of loads typically cannot encompass a wide enough frequency range to obtain the reduction in switching frequency that is needed in order to provide greatly increased efficiency in the standby mode.

Figure 2:
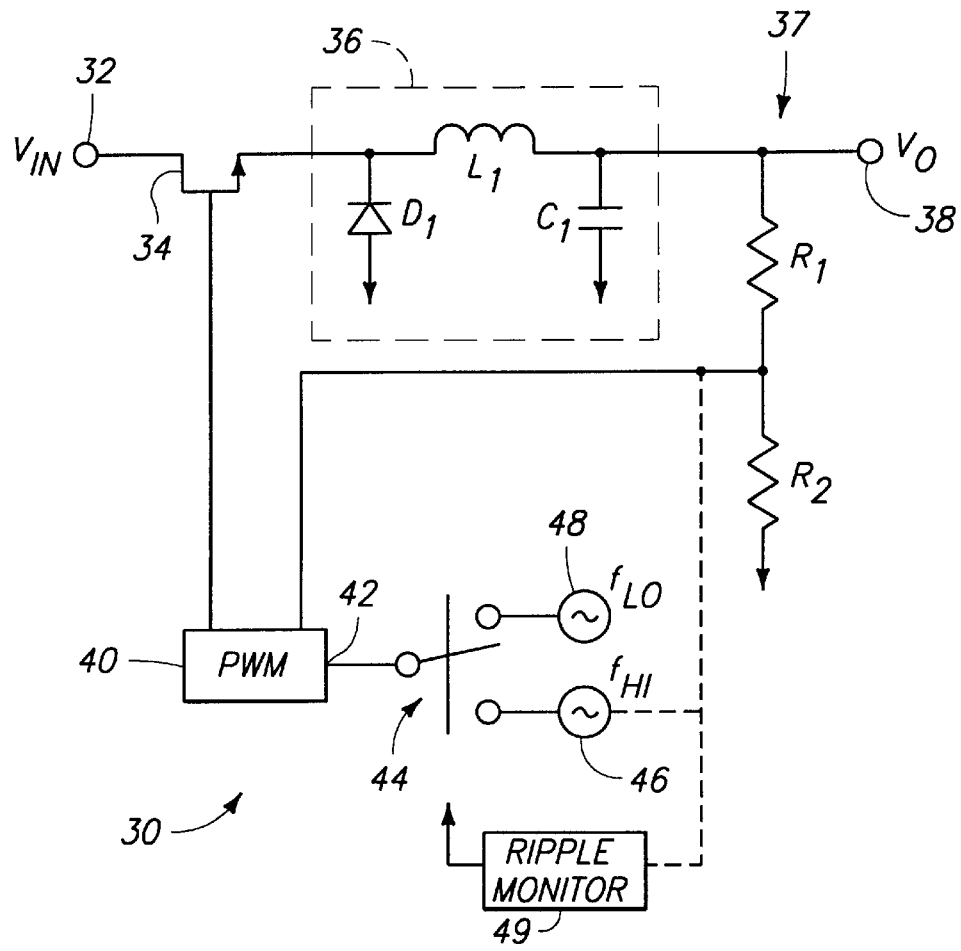
FIG. 2 is a simplified schematic diagram of a multiple frequency switching power supply, in accordance with an embodiment of the present invention.

FIG. 2 is a simplified schematic diagram of a multiple frequency (MF) switching power supply 30, in accordance with an embodiment of the present invention. The MF switching power supply 30 may be used for the multiple frequency switching power supply 12 of FIG. 1. The MF switching power supply 30 includes a power input port 32 to accept an input voltage $V_{IN}$, a switching transistor 34, a filtering circuit 36, a voltage divider 37, a power output port 38 to provide an output voltage $V_{OUT}$ and a pulse width modulation (PWM) circuit 40 having an input 42. The MF switching power supply 30 also includes a switch 44 and multiple clock signal sources or oscillators 46 and 48.

The PWM circuit 40 input 42 may be switched by the switch 44 to selectively couple one of several oscillators 46 and 48 to the PWM circuit 40 in response to control signals from the power consumption monitor 22 of FIG. 1. When the power consumption monitor 22 detects reduced power consumption, the power consumption monitor 22 causes the switch 44 to switch from a first clock signal from a first oscillator 46 having a first clock frequency $f_{HI}$ to a second clock signal from a second oscillator 48 having a second clock frequency $f_{LO}$, reducing the clock frequency, and thus the switching frequency of the switching transistor 34, by one or several orders of magnitude in the standby mode.

When the power consumption monitor 22 detects increased power consumption, the power consumption monitor 22 causes the switch 44 to switch from the second oscillator 48 to the first oscillator 46, increasing the output current from the MF switching power supply 30 and restoring the laser printer 10 of FIG. 1 to normal operation. In one embodiment, the first clock frequency $f_{HI}$ is 100 kilohertz and the second clock frequency $f_{LO}$ is 1 kilohertz.

It will be appreciated that the frequency $f_{HI}$ of the first clock signal may be varied in a continuous fashion in order to operate the multiple frequency switching power supply 12 at high efficiency over a range of loads in the normal mode. A VCO may be used for the first oscillator 46 to allow the clock frequency $f_{HI}$ to increase as the current output from the multiple frequency switching power supply 12 is increased.

For example, the first oscillator 46 may sense power supply loading using the voltage divider 37, as indicated by a dashed line in FIG. 2. Variation of switching power supply operating frequency to maintain high efficiency over a range of loads is discussed in U.S. Pat. No. 5,691,632, issued to Otake and hereby incorporated herein by reference. The MF switching power supply 30 operates by turning the switching transistor 34 ON and OFF to supply electrical charge from the power input port 32 to the filtering circuit 36. The resistive voltage divider 37 is formed from two resistors $R_1$ and $R_2$ and provides a node at a junction of the two resistors $R_1$ and $R_2$ for one input of the PWM circuit 40. A gate of the switching transistor 34 is coupled to an output of the PWM circuit 40. A pulse width of the ON portion of the duty cycle of the switching transistor 34 is varied in a conventional manner by the PWM circuit 40 in response to voltages sensed by the voltage divider 37 to regulate the amount of charge that is transferred per cycle from the power input port 32 to the filtering circuit 36 and thus to maintain the desired output voltage $V_{OUT}$ at the output 38.

The filtering circuit 36 acts to smooth out pulses from the switching transistor 34. In one embodiment, the filtering circuit 36 includes a series-connected inductor $L_1$ and a shunt-connected capacitor $C_1$. A diode $D_1$ acts as a clamp to prevent transient changes in current through the inductor $L_1$ from driving the side of the inductor $L_1$ that is coupled to the switching transistor significantly below ground.

Figure 3:
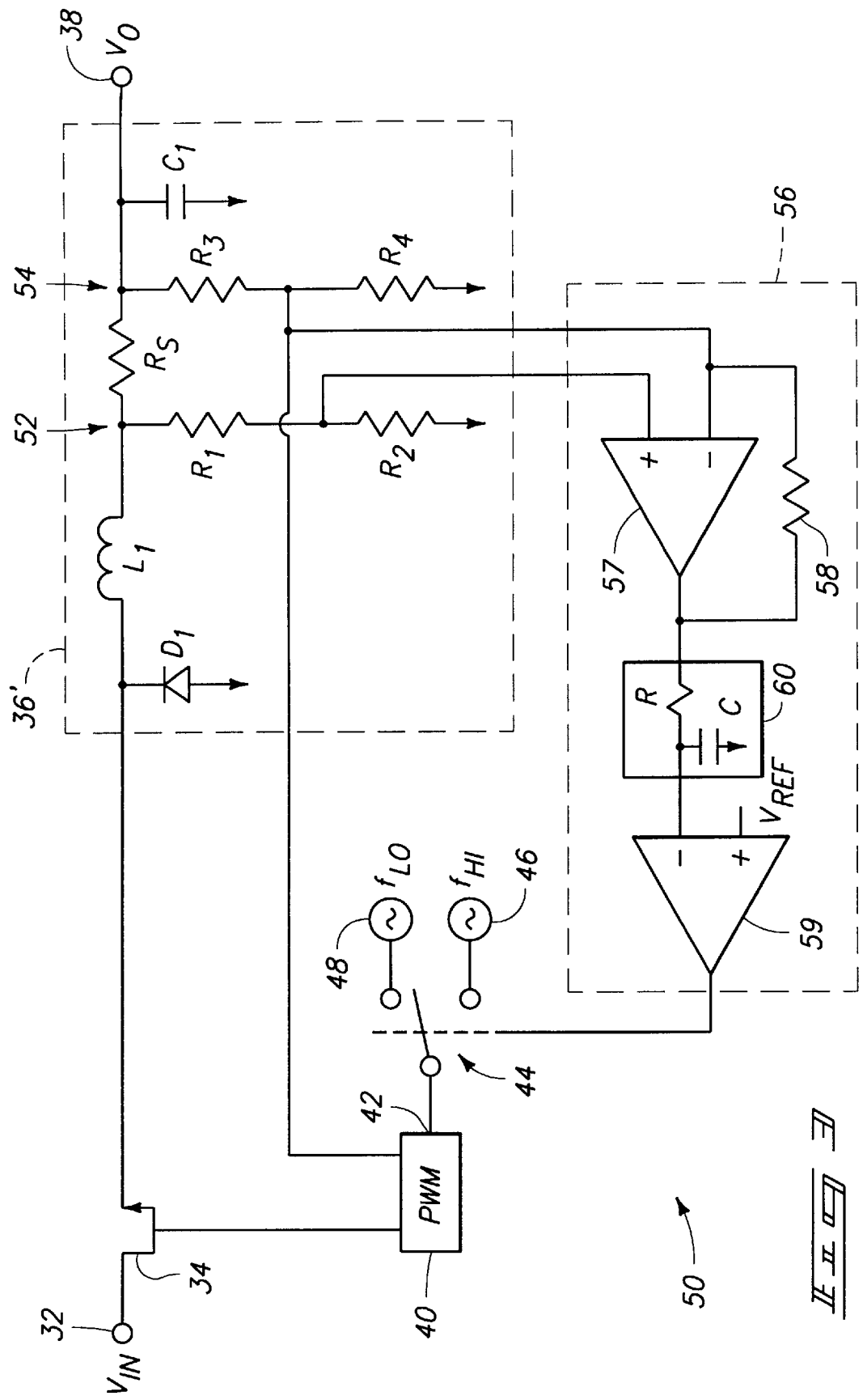
FIG. 3 is a simplified schematic diagram of a multiple frequency switching power supply, in accordance with an embodiment of the present invention.

FIG. 3 is a simplified schematic diagram of a multiple frequency switching power supply 50, in accordance with an embodiment of the present invention. Many elements used in the MF switching power supply 50 are identical to elements used in the MF switching power supply 30 of FIG. 2. These elements are given the same reference numbers as are used in FIG. 2 and explanation of these elements will not be repeated. The dashed line coupling the first oscillator 46 ($f_{HI}$) to the voltage divider 37 of FIG. 1 has been eliminated from subsequent Figures for clarity of illustration.

The MF switching power supply 50 includes a modified filtering circuit 36'. The modified filtering circuit 36' includes three additional resistors, $R_s$, $R_3$ and $R_4$. The resistor $R_s$ is a low value resistor coupled between the inductor $L_1$ and the capacitor $C_1$ that develops a small voltage proportional to the current being drawn from the MF switching power supply 50. A first voltage divider 52 is formed by resistors $R_1$ and $R_2$ coupled in series between a first end of the resistor $R_s$ and ground, and a second voltage divider 54 formed by resistors $R_3$ and $R_4$ coupled between a second end of the resistor $R_s$ and ground.

A voltage difference between voltages developed in the first voltage divider 52 and the second voltage divider 54 is sensed by a current sensing circuit 56. The current sensing circuit 56, together with the current sensing resistor $R_s$ and the first and second voltage dividers 52 and 54, is one embodiment of the power consumption monitor 22 of FIG. 1.

In one embodiment, the current sensing circuit 56 includes a first operational amplifier 57, a resistor 58 and a second operational amplifier 59.

The first operational amplifier 57 has a non-inverting input coupled to a node joining the resistors $R_1$ and $R_2$ forming the first voltage divider 52. The first operational amplifier 57 has an inverting input coupled to a node joining the resistors $R_3$ and $R_4$ forming the second voltage divider 54. The resistor 58 sets a gain for the first operational amplifier 57.

An output signal from the first operational amplifier 57 is coupled to an inverting input to the second operational amplifier 59. A reference voltage $V_{REF}$ is coupled to a non-inverting input to the second operational amplifier 59. The reference voltage $V_{REF}$, together with the resistor 58, the resistor $R_s$ and the first and second voltage dividers 52 and 54, determine a current level at which the current sensing circuit 56 switches from a normal operating state to a standby state and vice versa.

An output of the second operational amplifier 59 is coupled to the switch 44. When the current sensing circuit 56 detects that the current being drawn from the output 38 has dropped below a threshold level, the output from the second operational amplifier 59 switches the PWM 40 from the first oscillator 46 providing the first clock signal ($f_{HI}$) to the second oscillator 48 providing the second clock signal ($f_{LO}$). This puts the MF switching power supply 50 into the standby mode. When the current sensing circuit 56 detects that the current being drawn from the output 38 has increased above the threshold, the second operational amplifier 59 changes state, switching the switch 44 to provide the first clock signal ($f_{HI}$). This puts the MF switching power supply 50 back into the normal operating mode from the standby mode.

FIG. 4 is a simplified schematic diagram of a multiple frequency switching power supply 70, in accordance with an embodiment of the present invention. The MF switching power supply 70 includes a duty cycle sensing circuit 72 having an input coupled to the gate of the switching transistor 34 and having an output coupled to the switch 44. When the duty cycle sensing circuit 72 detects that the duty cycle of the switching transistor 34 falls below a threshold, the duty cycle sensing circuit 72 causes the switch 44 to couple the second oscillator 48 supplying the second clock signal ($f_{LO}$) to the PWM 40. This sets the MF switching power supply 70 to the standby mode of operation.

When the duty cycle sensing circuit 72 detects need for increased power output from the MF switching power supply 70, for example due to increased duty cycle of the switching transistor 34, the duty cycle sensing circuit 72 switches the MF switching power supply 70 from the standby mode to the normal mode by coupling the first oscillator 46 to the PWM 40 to provide the first clock signal ($f_{HI}$) to the PWM 40.

It will be appreciated that the switching transistor 34 of FIGS. 2 through 4 may be a MOS power transistor (as shown) or may be a bipolar power switching transistor. Other types of switching elements that may be pulse width modulated may also be employed.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A multiple frequency switching power supply comprising:
   a pulse width modulation circuit having an output, having an input and having a clock signal input;
   a switching transistor having first and second current-carrying electrodes and having a control electrode, the first current-carrying electrode being coupled to a voltage source, the control electrode being coupled to the output of the pulse width modulation circuit, the second current-carrying electrode being coupled to a power supply output;
   a voltage sensing circuit coupled to the power supply output and having an output coupled to the pulse width modulation circuit input; and
   a switch coupled to the clock input of the pulse width modulation circuit, the switch supplying a first clock signal having a first frequency when the power supply is in a normal mode of operation and supplying a second clock signal having a second frequency more than order of magnitude lower than the first frequency when the power supply is in a standby mode of operation.

2. The power supply of claim 1, wherein the first frequency is in a band of frequencies and the second frequency is outside the band of frequencies.

3. The power supply of claim 1, wherein the first frequency is from a voltage controlled oscillator responsive to an output current from the power supply, the voltage controlled oscillator providing a first clock signal that has a frequency proportional to the output current.

4. The power supply of claim 1, wherein the voltage sensing circuit includes a resistive voltage divider.

5. The power supply of claim 1, further comprising a filtering circuit having an input coupled to the second current-carrying electrode of the switching transistor and having an output coupled to the power supply output and configured to provide a regulated output voltage.

6. The power supply of claim 5, wherein the filtering circuit includes:
   an inductor having a first lead coupled to the second current carrying electrode of the switching transistor and having a second lead coupled to the power supply output; and
   a capacitor having a first lead coupled to the power supply output and having a second lead coupled to ground.

7. The power supply of claim 1, wherein the first frequency is several orders of magnitude greater than the second frequency.

8. The power supply of claim 1, wherein the first frequency is about 100 kilohertz and the second frequency is about one kilohertz.

9. The power supply of claim 1, wherein the switch toggles from supplying the first clock signal to supplying the second clock signal and vice versa in response to signals from circuitry external to the power supply.

10. The power supply of claim 1, wherein the switch toggles from supplying the first clock signal to supplying the second clock signal and vice versa in response to signals from a power consumption monitor internal to the power supply.

11. A multiple frequency switching power supply comprising:
   a pulse width modulation circuit having an output, having an input and having a clock signal input;
   a switching transistor having current-carrying electrodes coupled to a voltage source and to a power supply output to provide a regulated output voltage, respectively, and having a control electrode coupled to the output of the pulse width modulation circuit;
   a voltage sensing circuit coupled to the power supply output and having an output coupled to the pulse width modulation circuit input; and
   a switch coupled to the clock input of the pulse width modulation circuit, the switch supplying a first clock signal having a first frequency when the power supply is in a normal mode of operation and supplying a second clock signal having a second frequency when the power supply is in a standby mode of operation.

12. The power supply of claim 11, further comprising a power consumption monitor providing signals to the switch to toggle the switch comprising:
   a first voltage divider having an input coupled to the second current-carrying electrode and having a first output;
   a current sensing resistor having a first electrode coupled to the second current carrying electrode and a second electrode coupled to the power supply output;
   a second voltage divider having an input coupled to the power supply output and having a second output;
   a first differential amplifier having a first input, a second input and an output, the first input being coupled to the first voltage divider output, the second input being coupled to the second voltage divider output; and
   a second differential amplifier having a first input, a second input and an output, the first input being coupled to the first amplifier output, the second input being coupled to a reference voltage source and the output being coupled to the switch, the second differential amplifier providing a first voltage to the switch when an output current from the power supply output is above a threshold and providing a second voltage to the switch when the power supply output voltage is below the threshold.

13. The power supply of claim 11, further comprising a duty cycle detection circuit having an input and having an output, the input being coupled to the output of the pulse width modulation circuit, the output being coupled to the switch and causing the switch to couple the first clock signal to the pulse width modulation circuit when the duty cycle exceeds a threshold and causing the switch to couple the second clock signal to the pulse width modulation circuit when the duty cycle does not exceed the threshold.

14. The power supply of claim 11, wherein the first clock signal has a frequency that is related to a magnitude of a current being drawn from the power supply output.

15. The power supply of claim 11, wherein the second clock signal has a frequency that is several orders of magnitude lower than a frequency of the first clock signal.

16. The power supply of claim 11, where in the switching transistor is a MOS switching transistor.

17. The power supply of claim 11, wherein the power supply is a buck converter.

18. The power supply of claim 11, further comprising:
   a first oscillator providing the first clock signal, the first oscillator having an output coupled to the switch; and
   a second oscillator providing the second clock signal, the second oscillator having an output coupled to the switch.

19. The power supply of claim 18, wherein the first oscillator is a voltage controlled oscillator responsive to the regulated output voltage.

20. A laser printer comprising:
   a data input port;
   a data memory coupled to the data input port;
   a controller coupled to the data memory, the controller regulating data input and output operations of the data memory and providing data processing capability;
   a print engine providing printed output in response to data from the data memory and commands from the controller; and
   a switching power supply supplying electrical power to the data memory and the controller, the switching power supply comprising:
      a pulse width modulation circuit having an output, having an input and having a clock signal input;
      a switching transistor having current-carrying electrodes coupled to a voltage source and to a power supply output to provide a regulated output voltage, respectively, and having a control electrode coupled to the output of the pulse width modulation circuit;
      a voltage sensing circuit coupled to the power supply output and having an output coupled to the pulse width modulation circuit input; and
      a switch coupled to the clock input of the pulse width modulation circuit, the switch supplying a first clock signal having a first frequency when the power supply is in a normal mode of operation and supplying a second clock signal having a second frequency when the power supply is in a standby mode of operation.

* * * * *